Figure 1:
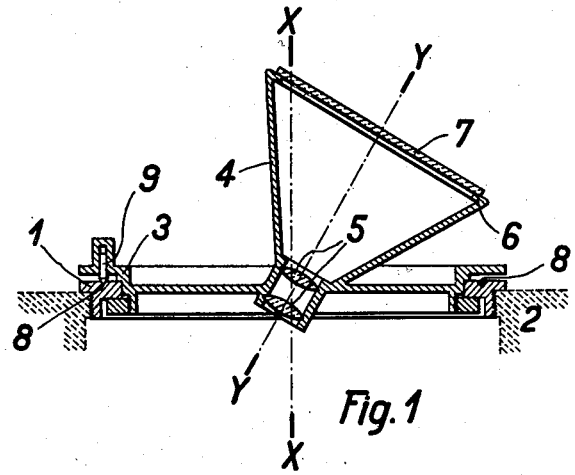

Inventors:
Otto v. Gruber
Franklin Pfeiffer

Dec. 4, 1934.   O. VON GRUBER ET AL   1,983,328
IMAGE PLATE HOLDING CHAMBER FOR IMAGE MEASURING DEVICES
Filed Jan. 6, 1932   2 Sheets-Sheet 2

Inventors:
Otto von Gruber
Franklin Pfeiffer

Patented Dec. 4, 1934

1,983,328

UNITED STATES PATENT OFFICE 1,983,328

IMAGE-PLATE HOLDING CHAMBER FOR IMAGE-MEASURING DEVICES

Otto von Gruber and Franklin Pfeiffer, Jena, Germany, assignors to the firm of Carl Zeiss, Jena, Germany Application January 6, 1932, Serial No. 585,023
In Germany January 10, 1931

5 Claims. (Cl. 88—29)

We have filed an application in Germany, January 10, 1931.

The invention concerns an image-plate holding chamber for image-measuring devices which is similar to a single camera and in which the carrier for adjusting the image to be measured can be rotated about several, generally three, axes.

The invention provides means for giving the optical axis of the chamber different spatial positions by adjusting the chamber relatively to its carrier, and this without the necessity of moving the latter.

The purpose of the new device is to facilitate the measuring process by simplifying the connection of consecutive images obtained simultaneously by means of a multiple camera. The invention attains this improvement by avoiding the destruction of the adjustment of the carrier which hitherto has been necessary when effecting a change from the measurement of one single image to that of the contiguous one.

Solutions of this task have been suggested repeatedly. However, contrary to the present invention, all these solutions do not provide a single chamber for the image-plate holding chamber but rather make use of a multiple chamber provided with only one objective which is to be coordinated to the different images to be measured by turning it relatively to the housing of the multiple chamber. When compared with the solution concerned in the present case, the said known solutions have the disadvantage that in the overlapping parts of the images not all image points are accessible for measuring when, as is appropriate with such measuring instruments, the objective is rotatable about its front principal point.

An especially simple constructional form of a chamber according to the invention is arrived at when a frame is so disposed on the carrier of the chamber that it partakes of all adjustments of the carrier and when this frame is provided with stops or the like in such a manner that, by completely taking it away from the frame and replacing it, the chamber can be given the different positions required to provide for its objective the axial directions necessary for measuring the different consecutive images. When the objectives of the multiple camera used for photographing had different focal lengths, a single chamber having an objective of a certain focal length may eventually be replaced by another single chamber having an objective of a different focal length.

It is of advantage to make the chamber rotatable relatively to its carrier, in which case it is convenient to provide locking devices of any kind which have to exactly adjust the chamber in the different positions required for measuring the different consecutive images.

In case more moderate demands are made upon easy and quick manipulation it is sufficient to construct the chamber in such a way that it serves as a carrier for only one image, when the supporting frame of the chamber is conveniently to be provided with known means for substituting without any great loss of time another consecutive image for the one inserted.

When greater demands are made it is advisable to provide the chamber with a plate changing device for alternatively coordinating the consecutive images to the objective in a simple manner. This plate changing device may be so constructed that changing the images is effected by shifting or turning them relatively to the chamber. In the latter case a convenient constructional form is arrived at by providing the image plates on a disc which is rotatably mounted on the chamber in a suitable manner.

Especially simple conditions for manipulating the device are arrived at when, as described hereinbefore, the chamber is rotatably mounted relatively to its carrier and when a plate changing device similar to the one described is so coupled to the appliance for turning the chamber relatively to its carrier that in any of the requisite positions of the objective the respective consecutive image is coordinated to this objective.

Figure 2:
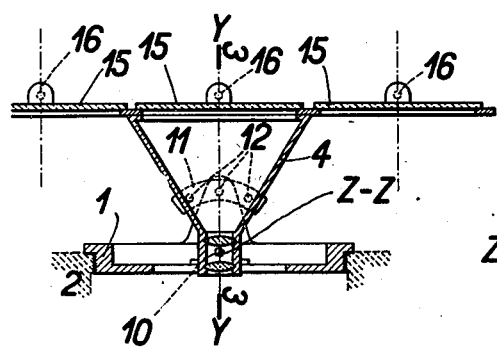
Figure 3:
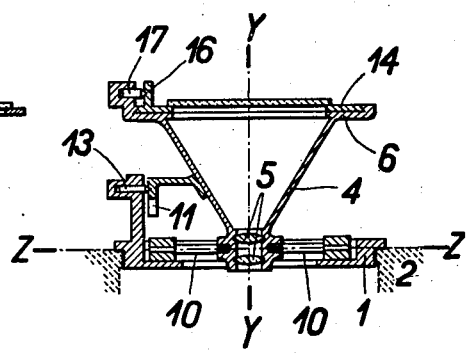
Figure 4:
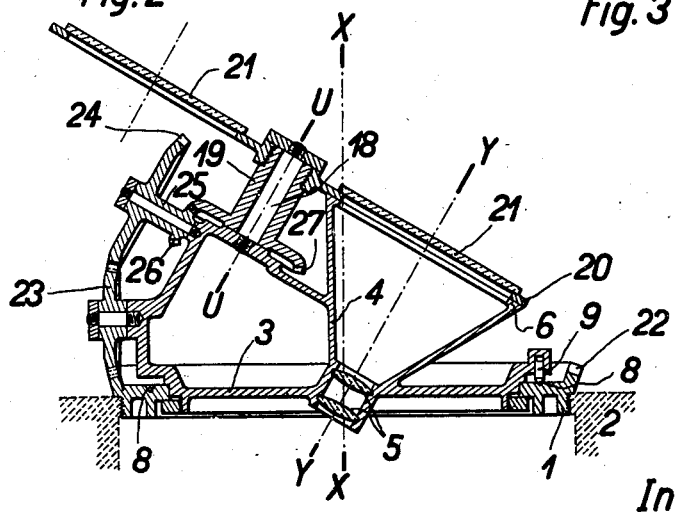
Figure 5:
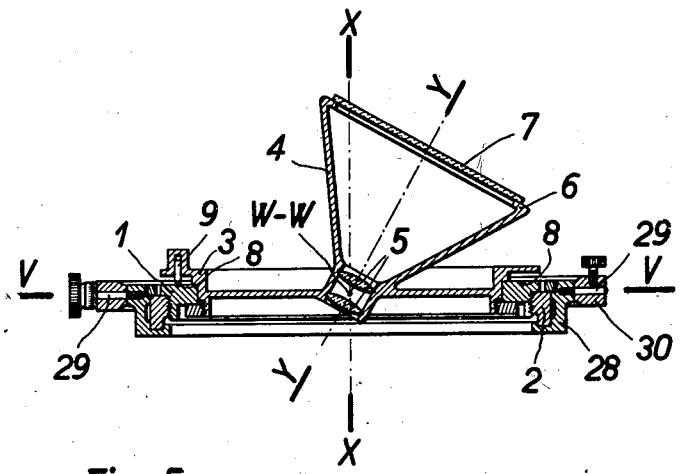
Figure 6:
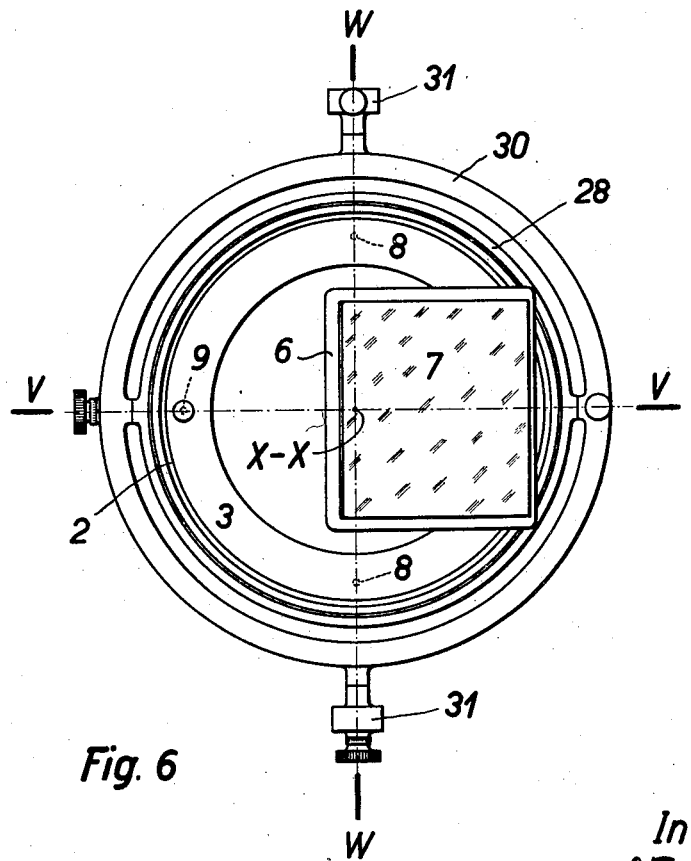

In the accompanying drawing, Figures 1 to 4 illustrate in vertical sections through the optical axis of the chamber objective three constructional examples of an image-plate holding chamber according to the invention. Figures 5 and 6 illustrate in vertical section through the optical axis of the chamber objective and in horizontal view the same constructional example as Figure 1, but with the well known mounting of the carrier of the chamber to the stand of a stereoscopic image measuring device. The first example, Figure 1, concerns an image-plate holding chamber for only one single image plate. The two other constructional examples refer to an image-plate holding chamber provided with a plate changing device. Figures 2 and 3 illustrate the one of these two examples, in which the plates are changed by displacing them relatively to the housing of the image-plate holding chamber and in which the rotation of this housing relative to the carrier of the image-plate holding chamber and the said displacement are to be effected independently of each other. Figure 4 represents the other of these two examples, in which the plates are changed by rotating them relatively to the housing of the image-plate holding chamber and this in such a manner that all movements are automatic and simultaneous.

The image-plate holding chamber represented more or less schematically by Figure 1, contains a frame 1 screwed to the carrier 2 for the image-plate holding chamber. The carrier 2 is assumed to be a ring rotatably mounted in the known manner (that is to say about two or three axes) on the stand of a stereoscopic-image measuring device, or on a slide system displaceable relatively to the said stand, in such a way that the image-plate holding chamber can be given a position which corresponds to that of the appertaining photographic camera. On the frame 1 an annular body 3 is mounted for rotation about an axis X—X. This annular body 3 is so constructed that it forms the housing of the image-plate holding chamber and contains the objective 5 as well as the support frame 6 of an image plate 7. The axis of rotation X—X passes through the optical centre of the objective 5. By means of a locking device comprising catches 8, which are provided in the frame 1, and a pin 9, which is provided in the annular body 3, this annular body 3 is arrested in different positions relatively to the frame 1 when turned about the axis X—X. The catches 8 are so provided in the frame 1 that the different positions they and the pin 9 give the optical axis Y—Y of the objective 5 correspond to the positions which were taken during the exposure by the optical axes of the different objectives of the multiple camera. As soon as the image plate 7 is measured, another image plate is to be placed on the support frame 6, that is to say an image plate of that image-plate group which had been exposed by simultaneously operating the shutters of the multiple camera. At the same time the annular body 3 must be rotated into that position in which the optical axis of the objective 5 corresponds to the position of the optical axis of that objective by means of which the said other image plate was obtained during the exposure. In order to dispense with special adjustments, it is advisable to provide each plate in a frame which is to be fixed to the said support frame 6 by means of pins or similar means.

All parts of the constructional forms described in the following are given as far as possible the designations used with respect to Figure 1.

In the image-plate holding chamber represented by Figures 2 and 3, 1 designates a frame screwed to the carrier 2 of an image-plate holding chamber. The housing 4 of the image-plate holding chamber, which contains the objective 5 and the frame 6, is mounted on the said frame 1 by means of two pins 10 in such a manner that it is rotatable about an axis Z—Z. This axis of rotation Z—Z passes through the optical centre of the objective 5. By means of a locking device comprising three recesses 12, which are provided in a curved plate fixed to the housing 4, and a pin 13, which is inserted in the frame 1, the said housing 4 can be adjusted in three different positions relatively to the frame 1. The recesses 12 are located in such a manner that the different positions which the optical axis Y—Y of the objective 5 is given when the pin 13 is arrested by them correspond to the positions of the optical axes of the different objectives of the multiple camera used for photographing. The constructional example is based on the special case that the multiple camera had three chambers of which the middle one was meant for vertical exposures. The position corresponding to that of this middle camera is taken by the housing 4 in the drawing. A support 14 for three image plates 15 is displaceably mounted on this housing 4. By means of a locking device comprising three recesses 16, which are provided in the support 14, and a pin 17, which is inserted in the housing 4, the support 14 can be clamped in three different positions relatively to this housing 4. The recesses 16 are located in such a manner that the said positions of the holder 14 exactly correspond to the positions which the housing 4 is given by means of the recesses 12.

The image-plate holding chamber according to Figure 4 has a frame 1 which is screwed to the carrier 2. On this frame 1 is mounted an annular body 3 which is rotatable about an axis X—X. The annular body 3, which represents the housing 4 for the image-plate holding chamber, contains the objective 5 and the support frame 6. The axis of rotation X—X passes through the optical centre of the objective 5. By means of a locking device comprising recesses 8, which are provided in the frame 1, and a pin 9, which is inserted in the annular body 3, this annular body 3 can be adjusted in different positions relatively to the frame 1. The recesses 8 are located in such a manner that the different positions which the optical axis Y—Y of the objective 5 is given when the pin 9 is arrested by these recesses correspond to the positions of the optical axes of the different objectives of the multiple camera used for photographing. On a pin 18, which is so fixed on the annular body 3 that its axis U—U is parallel to the optical axis Y—Y of the objective 5, a disc 20 is rotatably mounted by means of a bush 19, the said disc 20 being a support of image plates 21. There are provided as many image plates 21 as recesses 8. The image plates 21 are assumed to be so adjusted on the disc 20 that each position determined by one of the recesses 8 and the pin 9, of the optical axis Y—Y of the objective 5 requires the disc 20 to be rotated about the axis U—U in a definite relation to the rotation of the annular body 3 about the axis X—X, when the plate 20 assumes that position in which the corresponding image plate 21 has such a position relative to the objective 5 which corresponds to that it had during the exposure. With a view to maintain the said definite relation between the rotation of the annular body 3 and that of the disc 20 provision is made of a wheel gear of a definite ratio of transmission. This wheel gear is constructed in the following manner. The frame 1 is provided with bevel wheel teeth 22 meshing with a bevel wheel 23 rotatable mounted on the annular body 3. This bevel wheel 23 meshes with the bevel wheel teeth 24 of a wheel body 25 which is provided also with bevel wheel teeth 26 meshing with bevel wheel teeth 27 of the bush 19.

With a view to making the reader better understand the present specification, addition is made of Figures 5 and 6, which illustrate how the carrier 2 of the image-plate holding chamber is mounted on the stand of an image-measuring device according to the foregoing description, the mounting of the carrier 2 having been assumed to be known on account of its general application in image-measuring devices and having therefore been omitted in Figures 1 to 4. The carrier 2 is annular and rotatable in an annular body 28 about the axis X—X (which is the axis about which the housing 3 of the image-holding chamber may rotate relatively to the frame 1 screwed to the carrier 2). By means of two journals 29, the annular body 28 is rotatably mounted on an annular body 30 in such a manner that its axis of rotation V—V intersects the axis of rotation X—X at the optical centre of the objective 5. The annular body 30 is rotatably so mounted on two columns 31 assumed to be rigidly connected to the frame of the image-measuring device as to be rotatable about an axis W—W at right angles to the axis of rotation V—V and intersecting the axis V—V at the point at which this axis intersects the axis of rotation X—X. Accordingly, the carrier 2 may be adjusted relatively to the frame of the image-measuring device about three axes, namely the axes X—X, V—V, and W—W.

We claim:

1. An image-plate holding chamber for image-measuring devices, this chamber being a single chamber and containing an objective, means for coordinating to this objective a plurality of image-plates subsequently to each other, a carrier for supporting the chamber, means for so adjusting the chamber relatively to the carrier that the optical axis of the objective may assume different positions relatively to the carrier, these different positions corresponding to the different positions of the optical axes of a multiple camera used for the exposure of the said image-plates, and locking means adapted to lock the chamber to the carrier in its different positions relative to the carrier, the carrier being adapted to be so rotated relatively to the image-measuring device that the said chamber, when locked to the carrier, may be given a position in which the position of the image-plate coordinated to the objective relative to the image-measuring device is equal to the position the image-plate assumed relatively to the landscape at the moment of the exposure.

2. An image-plate holding chamber for image-measuring devices, this chamber being a single chamber and containing an objective, means for coordinating to this objective a plurality of image-plates subsequently to each other, a carrier for supporting the chamber, means for tilting the chamber relatively to the carrier about an axis intersecting the optical axis of the objective at the optical centre of the objective and being at right angles to the optical axis, these tilting means being adapted to give this optical axis different positions relatively to the carrier, these different positions corresponding to the different positions of the optical axes of a multiple camera used for the exposure of the said image-plates, and locking means adapted to lock the chamber to the carrier in its different positions relative to the carrier, the carrier being adapted to be so rotated relatively to the image-measuring device that the said chamber, when locked to the carrier, may be given a position in which the position of the image-plate coordinated to the objective relative to the image-measuring device is equal to the position the image-plate assumed relatively to the landscape at the moment of the exposure.

3. An image-plate holding chamber for image-measuring devices, this chamber being a single chamber and containing an objective, means for coordinating to this objective a plurality of image-plates subsequently to each other, a carrier for supporting the chamber, means for turning the chamber relatively to the carrier about an axis intersecting the optical axis of the objective at the optical centre and embracing with the optical axis an angle smaller than 90°, these turning means being adapted to give this optical axis different positions relatively to the carrier, these different positions corresponding to the different positions of the optical axes of a multiple camera used for the exposure of the said image-plates, and locking means adapted to lock the chamber to the carrier in its different positions relative to the carrier, the carrier being adapted to be so rotated relatively to the image-measuring device that the said chamber, when locked to the carrier, may be given a position in which the position of the image-plate coordinated to the objective relative to the image-measuring device is equal to the position the image-plate assumed relatively to the landscape at the moment of the exposure.

4. In an image-plate holding chamber according to claim 1, a plate holder movably mounted on the chamber and adapted to carry a plurality of image-plates, and means for moving the holder relatively to the chamber, for changing the image-plates.

5. In an image-plate holding chamber according to claim 1, a plate holder movably mounted on the chamber and adapted to carry a plurality of image-plates, means for moving the holder relatively to the chamber, for changing the image-plates, and a gear coupling the plate holder to the said means for adjusting the chamber relatively to the said carrier.

OTTO V. GRUBER.
FRANKLIN PFEIFFER.